United States Patent

[11] 3,622,501

[72] Inventors Ralph J. Bertolacini
Chesterton;
Louis C. Gutberlet, Crown Point, both of Ind.
[21] Appl. No. 815,063
[22] Filed Apr. 10, 1969
[45] Patented Nov. 23, 1971
[73] Assignee Standard Oil Company
Chicago, Ill.

[54] CATALYST AND HYDROCARBON PROCESSES EMPLOYING SAME
14 Claims, 1 Drawing Fig.
[52] U.S. Cl. .................................................. 208/111, 252/455 Z
[51] Int. Cl. .................................................. C10g 13/02
[50] Field of Search .................................... 208/111, 120; 252/455

[56] References Cited
UNITED STATES PATENTS
3,394,074 7/1968 Buchmann et al. .......... 208/111
3,254,017 5/1966 Arey et al. .................. 208/59
3,140,253 7/1964 Plank et al. ................. 208/120
3,425,956 2/1969 Baker et al. ................. 252/455

Primary Examiner—Delbert E. Gantz
Assistant Examiner—G. J. Crasanakis
Attorneys—Arthur G. Gilkes, William T. McClain and James L. Wilson ABSTRACT: The catalyst comprises Group VIA and Group VIII metals and/or their compounds and an acidic support comprising large-pore crystalline aluminosilicate material and a large-pore-diameter alumina having a surface area within the range of about 150 to about 500 square meters per gram and an average pore diameter within the range of about 80 to about 200 Angstroms. Preferred Group VIA metals are molybdenum and tungsten. Preferred Group VIII metals are cobalt and nickel. The preferred large-pore crystalline aluminosilicate material is ultrastable, large-pore crystalline aluminosilicate material.

The processes are hydrocarbon conversion processes, a typical example of which is a hydrocracking process. The hydrocracking process comprises contacting in a hydrocracking reaction zone under hydrocracking conditions and in the presence of hydrogen petroleum hydrocarbon fractions with the catalyst of the present invention.

3,622,501

CATALYST AND HYDROCARBON PROCESSES EMPLOYING SAME

BACKGROUND OF THE INVENTION

The present invention is directed to a catalytic composition and to petroleum hydrocarbon conversion processes employing that catalytic composition. More particularly, it is directed to a process for treating mineral oil, which results in a chemical alteration of at least some of the hydrocarbon molecules of the mineral oils to form lower-molecular-weight molecules and mineral oils having different properties, and to the catalytic composition employed in such a process.

There are a large number of processes for hydrocracking petroleum hydrocarbon feedstocks and numerous catalysts that are used in these processes. Some of these processes can be used only to hydrocrack feedstocks which contain only low amounts of nitrogen compounds; while others adequately convert to lower-molecular-weight-hydrocarbon compound feedstocks which contain substantial amounts of nitrogen compounds. Many of the latter processes comprise two stages, a feed-preparation stage and a hydrocracking stage, the two stages employing different catalysts. The first stage, in general, contains a hydrodenitrogenation and hydrodesulfurization catalyst; the second stage; a hydrocracking catalyst. While many of the processes comprise two stages, some comprise only one stage, which may operate effectively with one catalyst or with two or more catalysts.

It is well known by those having ordinary skill in the art that catalysts that are useful for the hydrodenitrogenation and/or hydrodesulfurization of petroleum hydrocarbon streams, in general, comprise a hydrogenation component, such as cobalt, molybdenum, nickel, tungsten, other sulfuractive metals, their compounds or mixtures thereof, and a nonacidic or weakly acidic support, such as activated alumina. Typical hydrocracking catalysts comprise a hydrogenation component, such as cobalt, molybdenum, nickel, platinum, palladium, their compounds, or mixtures thereof, and an acidic cracking component Such acidic cracking component may be a mixture of refractory inorganic oxides such as silica-alumina, or boria-alumina; or an acid-treated inorganic oxide, such as a fluorided alumina; or a mixture of a specific type of aluminosilicate material and a refractory inorganic oxide, such as Y-type molecular sieves and silica-alumina.

A new catalytic composition, having superior activity for converting petroleum hydrocarbons, has been developed, which catalytic composition can be used in various hydrocarbon conversion processes. A hydrocracking process employing this catalytic composition is an embodiment of such a hydrocarbon conversion process.

SUMMARY OF THE INVENTION

A new catalytic composition has been developed. Broadly, this catalytic composition comprises as a hydrogenation component a member selected from the group consisting of (1) a metal from Group VIA of the Periodic Table of elements and a metal from Group VIII of the Periodic Table of Elements, (2) their oxides, (3) their sulfides, and (4) mixtures thereof and a cocatalytic acidic support comprising large-pore crystalline aluminosilicate material and a large-pore-diameter alumina having a surface area within the range of about 150 to about 500 square meters per gram and an average pore diameter within the range of about 80 to about 200 Angstroms. The large-pore crystalline aluminosilicate material may be ultrastable, large-pore crystalline material. Preferably, the large-pore crystalline aluminosilicate material is suspended in a matrix of the porous support material. The support is prepared by blending in a finely divided state the large-pore crystalline aluminosilicate material with a sol or gel of the large-pore-diameter alumina, followed by drying. The large-pore crystalline aluminosilicate material is present in an amount within the range of about 5 weight-percent to about 70 weight-percent, based upon the weight of said support; the preferred amount is in excess of 30 weight-percent, based upon the weight of said support.

The preferred Group VIA metals are molybdenum and tungsten, while the preferred Group VIII metals are cobalt and nickel. If the hydrogenation component of the catalyst comprises cobalt and molybdenum and/or their compounds, the cobalt would be present in an amount within the range of about 2 to about 5 weight-percent, calculated as $CoO$ and based upon the weight of the catalyst, and the molybdenum would be present in an amount within the range of about 4 to about 15 weight-percent, calculated as $MoO_3$ and based upon the total catalyst weight. If the hydrogenation component of the catalytic composition of the present invention comprises nickel and tungsten and/or their compounds, the nickel and tungsten may be present, broadly in a total amount within the range of about 0.02 to about 0.15 gram-atom of nickel and tungsten per 100 grams of catalyst and in a tungsten-to-nickel ratio within the range of about 0.5 to about 5.1.

The hydrocarbon conversion process of the present invention comprises contacting petroleum hydrocarbons in a hydrocarbon conversion reaction zone under hydrocarbon conversion conditions and in the presence of hydrogen with the catalytic composition of the present invention.

The hydrocracking process of the present invention comprises contacting a petroleum hydrocarbon fraction in a hydrocracking reaction zone under hydrocracking conditions and in the presence of hydrogen with the catalytic composition of the present invention.

DESCRIPTION AND THE PREFERRED EMBODIMENTS

The important processes for the conversion of petroleum hydrocarbon fractions are hydrodenitrogenation processes and hydrocracking processes. A hydrodenitrogenation process and a hydrocracking process, each employing the catalytic composition of the present invention, are embodiments of the present invention.

A hydrodenitrogenation process is a petroleum refining process wherein the nitrogen content of a petroleum hydrocarbon feedstock is substantially reduced at elevated temperature and pressure in the presence of a hydrogen-containing gas and a hydrodenitrogenation catalyst. Hydrogen is consumed in the conversion of organic nitrogen to ammonia. Furthermore, at least a portion of any sulfur that is present in any particular hydrocarbon feedstock is converted to hydrogen sulfide.

In a typical hydrodenitrogenation process, naphthas, gas oils, and even full boiling range hydrocarbon feedstocks may be treated to have their nitrogen contents substantially reduced. The feedstocks may boil in a range of about 350° F. to about 1,000° F., or above, and may contain up to 2,000 p.p.m. nitrogen, or more.

In the hydrodenitrogenation process of the present invention, the feedstock to be treated is contacted in the hydrodenitrogenation reaction zone with the hereinafter-described catalyst in the presence of hydrogen-affording gas. An excess of hydrogen is maintained in the reaction zone. Advantageously, a hydrogen-to-oil ratio of at least 5,000 standard cubic feet of hydrogen per barrel of feed (SCFB) is employed, and the hydrogen-to-oil ratio may range up to 40,000 SCFB. Preferably, a hydrogen-to-oil ratio of about 10,000 to about 25,000 SCFB is employed. The total pressure usually is between about 500 pounds per square inch gauge (p.s.i.g.) and about 5,000 p.s.i.g. and, preferably, between about 1,000 p.s.i.g. and about 2,000 p.s.i.g. The average catalyst bed temperature is within the range of about 400° F. to about 800° F.

and, preferably, in a range of about 650° F. to about 750° F. The liquid hourly space velocity (LHSV) typically is within the range of about 0.1 to about 20 volumes of hydrocarbon per volume of catalyst, and preferably within the range of about 0.5 to about 5 volumes of hydrocarbon per hour per volume of catalyst.

For use in the hydrodenitrogenation process of the present invention, the catalyst may be pretreated for several hours under a pressure within the range of about 0 p.s.i.g. to about 2,000 p.s.i.g. in flowing hydrogen at a temperature within the range of about 350° F. to about 750° F. The hydrogen flow rate may be within the range of about 20 standard cubic feet per hour per pound of catalyst (SCFHO) to about 200 SCFHP. Typically, the pressure and hydrogen flow rate are the same as those to be used in subsequent feed processing. Alternatively, a hydrogen stream containing small amounts of hydrogen sulfide, e.g., up to about 10 volume-percent, may also be used to pretreat the catalyst.

Hydrocracking is a generally term which is applied to petroleum refining process wherein hydrocarbon feedstocks which have relatively high molecular weight are converted to lower-molecular-weight hydrocarbons at elevated temperatures and pressure in the presence of hydrocracking catalyst and a hydrogen-containing gas. Hydrogen is consumed in the conversion of organic nitrogen and sulfur to ammonia and hydrogen sulfide, respectively, in the destruction of high-molecular-weight compounds into lower-molecular-weight compounds, and in the saturation of olefins and other unsaturated compounds. In hydrocracking processes, hydrocarbon feedstocks, such as gas oils that boil in the range of about 350° F. to about 1,000° F., typically, catalytic cycle oils boiling between about 350° F. and 850° F., are converted to lower-molecular-weight products, such as gasoline-boiling-range products and light distillates.

Typical hydrocarbon feedstocks contain nitrogen compounds in amounts such that the amount of nitrogen present is greater than 20 p.p.m. The nitrogen tends to reduce the activity of the catalyst used in the hydrocracking reaction. Such reduction in catalytic activity results in inefficient operation and poor product distribution and yields. As the nitrogen content increases, higher reaction temperatures are required to maintain a given conversion level. Generally, the nitrogen content of a hydrocarbon feedstock can be reduced by subjecting that feedstock to a feed-preparation treatment. In such instance, the nitrogen compounds are converted into ammonia. In addition, sulfur is converted into hydrogen sulfide.

Generally, low-temperature hydrocracking processes for maximizing gasoline-boiling-range products employ two processing stages. In the first stage, the feed preparation stage, the feedstock is hydrotreated to remove nitrogen and sulfur that are typically found in the usual refinery feedstocks. In the second stage, the hydrocracking stage, the pretreated hydrocarbon stream is converted to lower-boiling products.

There are also one-stage hydrocracking processes. In a one-stage process, the denitrogenation and desulfurization occur in the first part of the catalyst bed or in the first reactor or first two to three reactors of a multireactor system. Therefore, denitrogenation, desulfurization, and hydrocracking may be performed by the same catalyst in a one-stage process. But two different catalysts may be used; the first catalyst for the denitrogenation and desulfurization; the second catalyst, for the hydrocracking. However, ammonia and hydrogen sulfide formed from the denitrogenation and desulfurization, respectively, are passed over the second catalyst along with the hydrocarbons that are to be hydrocracked by the second catalyst. In a one-stage process, no separation step occurs between the first catalyst and the second catalyst whereby the ammonia and hydrogen sulfide are separated from the hydrocarbons.

The catalytic composition of the present invention may be used advantageously for hydrocracking of petroleum hydrocarbon fractions. It may be employed in either a one-stage hydrocracking process or a two-stage hydrocracking process.

For the hydrocracking process, the hydrocarbon feedstock to be charged may boil in the range between about 350° F. and about 1,000° F. When operating to maximize gasoline production, the feedstock preferably has an endpoint not greater than about 700°–750° F. Typically, a light catalytic cycle oil, or a light virgin gas oil, or mixtures thereof, boiling in the range of from about 350° F. to about 650° F. is employed as a feedstock. The feed may be pretreated to remove compounds of sulfur and nitrogen. The feed may have a significant sulfur content, ranging from 0.1 to 3 weight-percent and nitrogen may be present in an amount up to 500 p.p.m. or more. Temperature, space velocity, and other process variables may be adjusted to compensate for the effects of nitrogen on the hydrocracking catalyst activity.

The hydrocarbon feed preferably contains a substantial amount of cyclic hydrocarbons, i.e., aromatic and/or naphthenic hydrocarbons, since such hydrocarbons have been found to be especially well suited for providing a highly aromatic hydrocracked gasoline product. Advantageously, the feed contains at least about 35–40 percent aromatics and/or naphthenes.

In the hydrocracking process, the feedstock is mixed with a hydrogen-affording gas and preheated to hydrocracking temperature, then transferred to one or more hydrocracking reactors. Advantageously, the feed is substantially completely vaporized before being introduced into the reactor system. For example, it is preferred that the feed be all vaporized before passing through more than about 20 percent of the catalyst bed in the reactor. In some instances, the feed may be mixed phase vapor-liquid, and the temperature, pressure, recycle, etc. may be then adjusted for the particular feedstock to achieve the desired degree of vaporization.

The feedstock is contacted in the hydrocracking reaction zone with the hereinafter-described catalyst in the presence of hydrogen-affording gas. Hydrogen is consumed in the hydrocracking process and an excess of hydrogen is maintained in the reaction zone. Advantageously, a hydrogen-to-oil ratio of at least 5,000 SCFB is employed, and the hydrogen-to-oil ratio may range up to 20,000 SCFB. Preferably, about 8,000 to 15,000 SCFB is employed. A high-hydrogen partial pressure is desirable from the standpoint of prolonging catalyst activity.

The hydrocracking reaction zone is operated under conditions of elevated temperature and pressure. The total hydrocracking pressure usually is between about 700 p.s.i.g. and 4,000 p.s.i.g. and, preferably, between about 1,000 p.s.i.g. and 1,800 p.s.i.g. The hydrogen partial pressure, in general, is within the range of about 675 p.s.i.g. to about 3,970 p.s.i.g. The hydrocracking reaction is exothermic in nature and a temperature rise occurs across the catalyst bed. The average hydrocracking catalyst bed temperature is between about 650° F. and 850° F.; and, preferably, a temperature between about 680° F. and 800° F. is maintained. The LHSV typically is within the range of about 0.1 to about 10 volumes of hydrocarbon per hour per volume of catalyst, and preferably within the range of about 0.5 to about 5 volumes of hydrocarbon per hour per volume of catalyst. Optimally, the LHSV is within the range of about 1 to about 2.

The catalytic composition of the present invention may be used also for the disproportionation of petroleum hydrocarbons wherein alkyl groups of aromatic hydrocarbons are transferred from one molecule to another. This latter process comprises contacting the petroleum hydrocarbon stream in a hydrocarbon conversion zone with a catalytic composition of this invention in the presence of a hydrogen-affording gas under suitable hydrocarbon disproportionation conditions.

For the disproportionation process, typical feedstocks are petroleum hydrocarbon streams which contain monocyclic and dicyclic aromatic hydrocarbons which boil below about 650° F. Such aromatic hydrocarbon streams may be a petroleum hydrocarbon fraction which contains aromatics, or it may be an aromatic hydrocarbon. For example, the feedstock may contain toluene, ortho-xylene, meta-xylene, and para-xylene, trimethylbenzenes, and tetramethylbenzenes. Typically, in the disproportionation process, the feedstock is mixed with a hydrogen-affording gas and preheated to a suitable disproportionation temperature, and then transferred to the disproportionation reaction zone, which may contain one or more reactors. Advantageously, the feed is substantially completely vaporized before being introduced into the reaction zone.

The feedstock is contacted in the disproportionation reaction zone with the hereinafter described catalyst in the presence of hydrogen-affording gas. Advantageously, a hydrogen-to-oil ratio of at least 1,000 SCFB is employed, and the hydrogen-to-oil ratio may range up to 50,000 SCFB. Preferably, the hydrogen-to-oil ratio may range between about 5,000 SCFB and 30,000 SCFB. Other operating conditions include an elevated temperature ranging between about 700° F. and about 1,100° F., preferably between about 850° F. and about 1,000° F.; an elevated pressure ranging between about 100 p.s.i.g. and about 1,000 p.s.i.g., preferably between about 200 p.s.i.g. and about 500 p.s.i.g.; and a weight hourly space velocity (WHSV) ranging between about 0.1 and about 20 weight units of hydrocarbon per hour per weight unit of catalyst, preferably between about 1 and about 10 weight units of hydrocarbon per hour per weight unit of catalyst. The exothermic demethanation reaction that occurs in the disproportionation reaction zone may be controlled by the treatment of the catalyst with sulfur compounds, such as hydrogen sulfide and carbon disulfide, either prior to or at the start of the disproportionation reaction.

In addition to being a catalyst for hydrodenitrogenation, for hydrocracking, and for disproportionation, the catalytic composition of the present invention is a suitable catalyst for the isomerization of alkyl aromatics, the transalkylation between aromatic hydrocarbons, the hydrodealkylation of hydrocarbon substituted aromatic compounds, and the reforming of the petroleum hydrocarbon naphtha streams.

The catalytic composition of this invention comprises as a hydrogenation component a member selected from the group consisting of (1) a metal from Group VIA of the Periodic Table of Elements and a metal from Group VIII of the Periodic Table of Elements, (2) their oxides, (3) their sulfides, and (4) mixtures thereof and a cocatalytic acidic support comprising large-pore crystalline aluminosilicate material and a large-pore-diameter alumina.

The hydrogenation component may be deposited on the acidic support, or it may be incorporated into the acidic support by impregnation of heat-decomposable salts of the desired metals. Each of the metals may be impregnated into the support separately or they may be coimpregnated into the support. Alternatively, the hydrogenation-component metals may be coprecipitated with a hydrogel of a large-pore-diameter alumina. In this latter method, the finely divided crystalline aluminosilicate material is thoroughly blended into the hydrogel and then each metal of the hydrogenation component is added separately to the blend in the form of a heat-decomposable salt of the metal. The composite is subsequently dried and calcined to decompose the salts and to remove the undesired anions.

Two preferred combinations of metals for the hydrogenation component of the catalytic composition of the present invention are (1) cobalt and molybdenum and (2) nickel and tungsten.

If the hydrogenation component comprises cobalt and molybdenum and/or their compounds, cobalt is present in an amount within the range of about 2 weight-percent to about 5 weight-percent, calculated as CoO and based upon the total weight of the catalyst and molybdenum is present in an amount within the range of about 4 weight-percent to about 15 weight-percent, calculated as $MoO_3$ and based upon the total weight of the catalyst.

If the hydrogenation component of the catalytic composition of the present invention comprises nickel and tungsten and/or their compounds, the nickel and tungsten may be present in the amounts specified below. Broadly, the nickel and tungsten may be present in a total amount within the range of about 0.02 to about 0.15 gram-atom of nickel and tungsten per 100 grams of catalyst and in a tungsten-to-nickel ratio within the range of about 0.5 to about 5.0. Advantageously, the nickel and tungsten may be present in a total amount within the range of about 0.04 to about 0.12 gram-atom of nickel and tungsten per 100 grams of catalyst and in a tungsten-to-nickel ratio within the range of about 1.5 to about 4.0. Preferably, the nickel and tungsten may be present in a total amount within the range of about 0.07 to about 0.11 gram-atom of nickel and tungsten per 100 grams of catalyst and in a tungsten-to-nickel ratio within the range of about 2 to about 3. The optimum tungsten-to-nickel ratio is 2.5.

The acidic support of the catalytic composition of the present invention comprises a large-pore crystalline aluminosilicate material and a large-pore-diameter alumina. While there are several large-pore crystalline aluminosilicate materials that may be employed in the catalytic composition of the present invention, ultrastable, large-pore crystalline aluminosilicate material is the preferred aluminosilicate material. The acidic support material may contain from about 5 weight-percent to about 70 weight-percent large-pore crystalline aluminosilicate material. Preferably, the acidic support may contain from about 30 weight-percent to about 50 weight-percent large-pore crystalline aluminosilicate material. It is preferred that the large-pore crystalline aluminosilicate material be distributed throughout and suspended in a porous matrix of the large-pore-diameter alumina.

Characteristics of many large-pore crystalline aluminosilicate materials and methods for preparing them have been presented in the chemical art. Their structure comprises a network of relatively small aluminosilicate cavities which are interconnected by numerous pores. These pores are smaller than the cavities and have an essentially uniform diameter at their narrowest cross section. Basically, the network of cavities is a fixed three-dimensional and ionic network of silica and alumina tetrahedra. These tetrahedra are cross-linked by the sharing of oxygen atoms. Cations are included in the crystal structure of the aluminosilicate material to balance the electrovalence of the tetrahedra. Examples of such cations are metal ions, hydrogen ions, and hydrogen-ion precursors, such as ammonium ions. By means of the technique known as cation exchange, one cation may be exchanged for another.

The crystalline aluminosilicate materials that are employed in the catalytic composition of this invention are large-pore materials. By large-pore material is meant material that has pores which are sufficiently large to permit the passage thereinto of benzene molecules and larger molecules and the passage therefrom of reaction products. For use in petroleum hydrocarbon conversion processes, it is preferred to employ a large-pore aluminosilicate material having a pore size of at least 9 to 10 Angstrom units. The large-pore crystalline aluminosilicate materials that are employed in the catalytic composition of this invention possess such a pore size.

The preferred ultrastable, large-pore crystalline aluminosilicate material is stable to exposure to elevated temperatures and stable to repeated wetting-drying cycles. Its stability is demonstrated by its surface area after calcination at 1725° F. After calcination at a temperature of 1725° F. for a period of 2 hours, there is retained a surface area of greater than 150 m.²/gm. Moreover, its stability is demonstrated by its surface area after a steam treatment with an atmosphere of 25 percent steam at a temperature of 1525° F. for 16 hours. Its surface area after this steam treatment is greater than 200 m.²/gm.

The ultrastable, large-pore crystalline aluminosilicate material exhibits extremely good stability toward wetting, which is defined as that ability of a particular aluminosilicate material to retain surface area or nitrogen-adsorption capacity after contact with water or water vapor. A sodium form of the ultrastable, large-pore crystalline aluminosilicate material (about 2.15 weight-percent sodium) was shown to have a loss in nitrogen-adsorption capacity that is less than 2 percent per wetting when tested for stability to wetting by subjecting the material to a number of consecutive cycles, each cycle consisting of a wetting and a drying.

The ultrastable, large-pore crystalline aluminosilicate material employed in the catalytic composition of this invention exhibits a cubic unit cell dimension and hydroxyl infrared bands that distinguish it from other aluminosilicate materials.

The cubic unit cell dimension of the ultrastable, large-pore crystalline aluminosilicate material is within the range of about 24.20 Angstrom units to about 24.55 Angstrom units.

The hydroxyl infrared bands obtained with the ultrastable, large-pore crystalline aluminosilicate material are a band near 3750 cm.$^{-1}$, a band near 3700 cm.$^{-1}$, and a band near 3625 cm.$^{-1}$. The band near 3750 cm.$^{-1}$ may be found on many of the hydrogen-form and decationized aluminosilicate materials, but the band near 3700 cm.$^{-1}$ and the band near 3625 cm.$^{-1}$ are characteristic of the ultrastable, large-pore crystalline aluminosilicate material that is employed in the catalytic composition of the present invention.

The ultrastable, large-pore crystalline aluminosilicate material is also characterized by an alkali metal content of less than 1 percent.

An example of the ultrastable, large-pore crystalline aluminosilicate material is Z-14US, which is described in U.S. Pat. No. 3,293,192.

It is essential that the alumina in the catalytic composition of the present invention have large-pore diameters. The average pore diameter of the alumina should be within the range of about 80 to about 200 Angstroms (A), suitably within the range of about 125 to about 180 A, and preferably within the range of about 135 to about 160 A; the surface area should be within the range of about 150 to about 500 square meters per gram, suitably within the range of about 300 to about 350 square meters per gram, and preferably within the range of about 320 to about 340 square meters per gram.

Suitable aluminas can be purchased from manufacturers of catalysts. For example, Nalco HF-type aluminas having surface areas within the range of about 300 to about 350 square meters per gram are available from the Nalco Chemical Company. These HF-type aluminas can be obtained with pore volumes varying from as low as 0.54 cubic centimeters per gram to as high as 2.36 cubic centimeters per gram and corresponding average pore diameters within the range of about 72 to about 305 A. Therefore, those Nalco HF-type aluminas which have the desired physical properties are suitable as the support of the catalytic composition of the present invention.

Suitable aluminas can be obtained from the American Cyanamid Company also. For example, a typical sample of American Cyanamid's Aero Extrudate 100, Sample No. 2234-2 was found to have an average pore diameter of 138 A and a surface area of 238 square meters per gram.

The alumina desired as a component of the acidic support of the catalytic composition of the present invention has a much higher average pore diameter than the aluminas used in conventional catalysts.

The cocatalytic acidic support of the catalytic composition of the present invention may be prepared by various well-known methods and formed into pellets, beads, and extrudates of the desired size. For example, the large-pore crystalline aluminosilicate material may be pulverized into finely divided material, and this latter material may then be intimately admixed with the large-pore-diameter alumina. The finely divided crystalline aluminosilicate material may be admixed thoroughly with a hydrosol or hydrogel of the large-pore diameter alumina.

Where a thoroughly blended hydrogel is obtained, this hydrogel may be dried and broken into pieces of desired shapes and sizes. The hydrogel may also be formed into small spherical particles by conventional spray-drying techniques or equivalent means.

Figure 1:
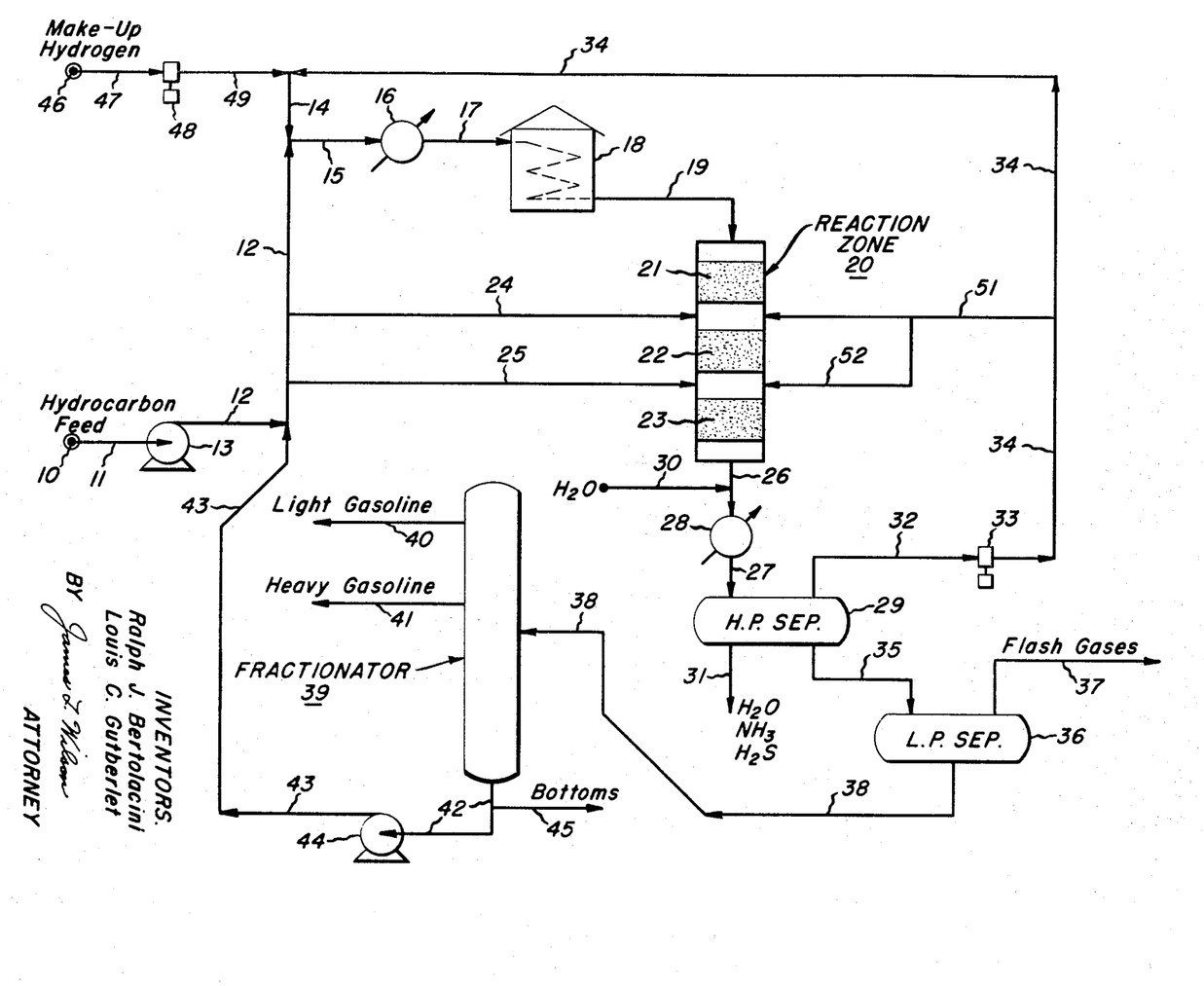
The accompanying drawing is a highly simplified schematic flow diagram of a preferred embodiment of a process of the present invention. In this embodiment, the process is a process for hydrocracking of petroleum hydrocarbons. Certain auxiliary equipment, such as valves, pumps, heat exchangers, and the like, are not shown, but would be recognized easily by those skilled in the art to be employed at selected points along the flow path of the process.

A preferred embodiment of the hydrocarbon conversion process of this invention is the one-stage hydrocracking process that is depicted in the accompanying drawing. This embodiment is for the purpose of illustration only and is not intended to limit the scope of the present invention.

Referring to the drawing, fresh hydrocarbon feed boiling within the range of about 400° F. to about 632° F. and containing 0.25 weight-percent sulfur and 159 parts per million nitrogen is obtained from feed source 10. This particular feed, a blend of 30 volume-percent light virgin gas oil (LVGO) and 70 volume-percent light catalytic cycle oil (LCCO) is pumped through lines 11 and 12 by means of pump 13. Hydrogen-affording gas is passed through line 14 and into line 12 to be intimately mixed with the fresh hydrocarbon feed therein. The resulting hydrogen-hydrocarbon mixture is passed through line 15, heat exchanger 16, and line 17 into furnace 18. The hot hydrogen-hydrocarbon mixture is then passed through line 19 into the top of hydrocracking reaction zone 20. Hydrocracking reaction zone 20 is made up of a number of consecutive catalyst beds separated by inert refractory material such as alumina balls. Catalyst beds 21, 22, and 23 are shown in the drawing. However, the number of three catalyst beds is in no way intended to limit the scope of the present invention and, conceivably, there could be more or less catalyst beds in the hydrocracking reaction zone than the three shown.

The catalyst in each of these beds is a preferred embodiment of the catalytic composition of the present invention. The catalyst comprises cobalt and molybdenum and/or their oxides and/or sulfides on a cocatalytic acidic support comprising ultrastable, large-pore crystalline aluminosilicate material suspended in a porous matrix of large-pore-diameter alumina. The cobalt is present as 2.5 weight-percent CoO; the molybdenum is present as 10 weight-percent $MoO_3$. The acidic support comprises about 35 weight-percent ultrastable, large-pore crystalline aluminosilicate material, based upon the weight of the support.

The temperature of the hot hydrogen-hydrocarbon feed mixture to reactor 20 is within the range of about 650° F. to about 690° F. at the beginning of the run and is gradually increased as the run progresses in order to compensate for the gradual decline in the activity of the catalyst. Since the hydrocracking reaction is exothermic, the temperature of the reactants tends to increase as the reactants pass downward through the bed of the catalyst. In order to control the temperature increase and to limit the maximum temperature within the reactor, a liquid quench stream is introduced into the reaction zone 20 at the spaces between beds 21, 22, and 23 by means of lines 24 and 25. This liquid quench is fresh feed from feed line 12 and/or recycle oil from recycle line 43 described hereinafter.

The process conditions include a temperature of about 650° F. to about 850° F., a LHSV of about 1 to about 5, and a pressure of about 1250 p.s.i.g., and a hydrogen recycle rate of about 9,000 SCFB. Effluent from the reaction zone 20 is passed through lines 26 and 27 and cooler 28 into high-pressure separator 29. Wash water may be introduced into line 26 by way of line 30. In line 26, the wash water is mixed with the hydrocracked effluent and upon passing through cooler 28 and line 27 separates as an aqueous phase in the high-pressure separator 29. The wash water dissolves any ammonia and hydrogen sulfide that is present in the effluent and removes them therefrom. This wash water containing the dissolved ammonia and hydrogen sulfide is withdrawn from high-pressure separator 29 by way of line 31. The gas which separates from the liquid in high-pressure separator 29 is withdrawn from high-pressure separator 29 via line 32, compressed by gas compressor 33, and passed via line 34 to be recycled by way of line 34 into line 14 and introduced into the hydrocarbon stream that is passing through line 12 for subsequent charging into hydrocracking reaction zone 20.

The liquid hydrocarbons are withdrawn from high-pressure separator 29 via line 35 and are passed by way of line 35 into low-pressure separator 36. The gas phase from low-pressure separator 36, comprising primarily light hydrocarbons and hydrogen, is withdrawn via line 37 as flash gases, which are used conveniently as fuel gas. The liquid hydrocarbon layer from the low-pressure separator 36 is withdrawn therefrom via line 38 and passed through line 38 to and into fractionator 39. In fractionator 39, the liquid hydrocarbons are fractionated into a light-gasoline fraction, a heavy-gasoline fraction, and a bottoms fraction. The light-gasoline fraction is withdrawn from fractionator 39 by way of line 40; the heavy-gasoline fraction, by way of line 41; and the bottoms fraction by way of line 42. The bottoms fraction is recycled via lines 42 and 43 and recycle pump 44, to be added to the fresh hydrocarbon feed in line 12, for introduction into the top of hydrocracking reaction zone 20 by way of lines 12, 15, 17, and 19, heat exchanger 16 and furnace 18 or into quench lines 24 and 25 by way of line 12. Undesired bottoms material may be removed from the system by way of line 45.

The heavy-gasoline fraction is withdrawn from fractionator 39 by way of line 41 for use in other refinery process units, such as a reformer. The light-gasoline fraction is withdrawn by way of line 40 for use in gasoline blending. Although fractionator 39 is shown as only one column, it is to be understood that other satisfactory recovery systems may be used and are deemed to be within the scope of the present invention. Such other satisfactory recovery systems are known by those having ordinary skill in the art. Alternatively, a butane stream can also be withdrawn.

Makeup hydrogen from source 46 is passed through line 47 and compressed in compressor 48. The compressed makeup hydrogen is then passed through lines 49 and 14 to be admixed with the hydrogen-hydrocarbon mixture to be introduced into hydrocracking reaction zone 20.

Quench gas may alternatively be used to control the temperature in the hydrocracking reaction zone 20. This quench gas may be a portion of the hydrogen-containing recycle gas passing through line 34. It may be removed from line 34 by way of lines 51 and 52, for introduction into the hydrocracking reaction zone 20 at the interstices between the catalyst beds in hydrocracking reaction zone 20.

The following example is presented to facilitate a better understanding of the present invention. It is to be understood that this example is for the purpose of illustration only and is not to be regarded as a limitation of the scope of the present invention.

Each of the tests in the following example was conducted in typical bench-scale equipment, which employed a tubular stainless steel reactor and conventional product-recovery and analytical equipment. The reactor was 20 inches long and had an inside diameter of 0.622 inch. The reactor temperature was maintained by use of a hot molten salt bath of DuPont HITEC. The internal reactor temperatures were measured by means of a coaxial thermocouple.

In each of the hydrocracking tests, a catalyst charge of 19 grams of granular material which would pass through a 12-mesh U.S. sieve, but not a 20-mesh U.S. sieve, was employed. The catalyst was supported in the lower one-third of the reactor on a layer of 4-millimeter Pyrex glass beads. The volume of reactor above the catalyst bed was empty. The catalyst bed occupied about 5.7 to about 7.1 inches of reactor length, depending upon the bulk density of the catalyst.

Prior to its hydrocracking test, each catalyst was pretreated at 1,250 p.s.i.g. and 500° F. for a period of 16 to 20 hours with hydrogen flowing at the rate of about 50 standard cubic feet per hour per pound of catalyst (SCFHP). Hydrocarbon feed was started at 500° F. and the temperature was increased over a period of several hours until the desired conversion level was reached. Thereafter, temperature was adjusted to maintain approximately 77 weight-percent conversion. Other processing conditions included a total pressure of 1,250 p.s.i.g., a LHSV within the range of about 0.9 cc. of hydrocarbon per hour per cc. of catalyst to about 1.1 cc. of hydrocarbon per hour per cc. of catalyst, a WHSV of about 1.38 grams of hydrocarbon per hour per gram of catalyst, and a hydrogen addition rate of about 12,000 SCFB. The hydrocarbon feedstock employed was a low-sulfur blend of LVGO and LCCO. Its properties are shown below in Table I.

TABLE I

Feed Properties

| ASTM Distillation, °F. | |
|---|---|
| IBP | 398 |
| 10 vol. % ovhd | 475 |
| 30 | 519 |
| 50 | 546 |
| 70 | 563 |
| 90 | 614 |
| Maximum | 632 |
| Gravity, °API | 27.5 |
| Refractive Index, $n_D^{80}$ | 1.5026 |
| Sulfur, wt. % | 0.25 |
| Nitrogen, p.p.m. | 159 |
| Molecular Weight | 209 |
| Hydrocarbon Type, vol % | |
| Paraffins | 23.5 |
| Naphthenes | 42.2 |
| Aromatics | 34.3 |

For each hydrocracking test, data were obtained from 1 to 13 days on stream. Weight balances were obtained on 2-hour samples taken at intervals of at least 24 hours. Product recoveries were generally above 99.0 weight-percent, based upon the weight of the hydrocarbon feed. Gas and liquid analyses were combined and normalized to 100 percent to obtain the conversion level. Product distributions were calculated to a total of 103 weight-percent, based on hydrocarbon feed, to account for hydrogen consumption.

As used herein, conversion is defined as the percent of the total reactor effluent, both gas and liquid, that boils below a true boiling point of 380° F. This percent was determined by gas chromatography. The hydrocarbon product was sampled for analyses at intervals of not less than 24 hours. The sampling period was 2 hours, during which time the liquid product was collected under a dry-ice-acetone condenser to insure condensation of pentanes and heavier hydrocarbons. During this time, the hydrogen-rich off-gas was sampled and immediately analyzed for light hydrocarbons by isothermal gas chromatography. The liquid product was weighed and analyzed using a dual-column temperature-programmed gas chromatograph equipped with 6-feet by ¼-inch columns of SF-96 on fire brick and thermal-conductivity detectors. Individual compounds were measured through methylcyclopentane. The valley in the chromatograph just ahead of the n-undecane peak was taken as the 380° F. point. The split between light and heavy naphtha (180° F.) was arbitrarily selected as a specific valley within the $C^7$-paraffin-naphthene group to conform with the split obtained by Oldershaw distillation of the product.

Temperature requirements for 77 percent conversion were calculated from the observed data by means of zero order kinetics and an activation energy of 35 kilocalories. Adjustment in temperature requirement was made also to a constant hydrogen-to-oil ratio of 12,000 SCFB using the equation: $\Delta T°F.=<\chi^{1.3})(R-12)$, where R is the gas rate in 1,000 SCFB.

The temperature required for 77 percent conversion was selected as the means for expressing the hydrocracking activity of the catalyst being tested. To eliminate irregular values that might be present at the start of the run, an estimated value for the temperature required for 77 percent conversion at 7 days on stream was obtained for each catalyst. To estimate these values, a plot showing the temperatures required for 77 percent conversion as ordinates and days on stream as abscissae was prepared and the value of the temperature at 7 days on stream was read from the smooth curve of this plot. This latter value was used to determine the activity of the catalyst that was employed in the test from which the plotted data were obtained.

The relative hydrocracking activity was obtained by using the following equation:

$$A = 100e - \frac{\Delta E}{R}\left[\frac{1}{T_0} - \frac{1}{T}\right], \text{ where}$$

A = the relative activity of the tested catalyst,
$\Delta E$ = 35,000 calories per gram-mole, R=1.987 calories per gram-mole per °K.,
T=the temperature of the test for the 7th day in °K., and
$T_0$=646° K.

The heavy naphtha yield, i.e., the yield of product boiling between 180° F. and 380° F., was corrected for temperature and conversion. The following equation was used to calculate the heavy naphtha yield at common conditions of 725° F. and 77 weight-percent conversion.

$$H_0 = H + 15.5 \times 10^4 \left(\frac{1}{T_0} - \frac{1}{T}\right) + 7.5 \times 10^8 \left(\frac{1}{T_0} - \frac{1}{T}\right)^2 + 13.2 \log\left(\frac{100-C_0}{100-C}\right),$$

where $H_o$=heavy naphtha yield at 725° F. and 77 weight-percent conversion,
H=observed heavy naphtha yield, in weight-percent.
$T_o$=658° K. (725° F.)
T=observed temperature in °K.,
$C_o$=77 weight-percent conversion, and
C=observed conversion The heavy naphtha yield was used to express catalyst selectivity.

EXAMPLE

In this example, three catalysts were prepared and tested for their hydrocracking activities and selectivities under conditions that were within the ranges suggested for the hydrocracking process of the present invention. These catalysts are hereinafter designated as Catalysts A, B, and C.

Catalyst A was prepared by using an alumina gel obtained from the Nalco Chemical Company. This gel had the Nalco designation 471A. A 250-gram portion of this Nalco gel was cation-exchanged with an ammonium sulfate solution for 3 hours at a temperature of 90° C. (194° F.). The ammonium sulfate solution had been prepared by dissolving 157 grams of ammonium sulfate in 1.5 liters of distilled water. Contacting of the gel with the solution was carried out with stirring. The cation-exchanged gel was filtered and water-washed with approximately 1.5 gallons of hot distilled water (about 160° F.) in 500 ml. increments. The cation-exchange procedure was repeated. After water-washing, the gel was found to contain about 1 weight-percent sodium. A 435-gram portion of the wet alumina gel, containing 30 percent solids, was blended with 88 grams of sodium-form, Y-type aluminosilicate material obtained from the Linde Division of Union Carbide Corporation. This Y-type aluminosilicate material contained 80 percent solids. The resultant material was dried in air for about 2 to 3 hours at a temperature of about 250° F. and an air flow rate of about 1.5 cubic feet per hour. The dried material was then ground to pass through a 30-mesh sieve (U.S. sieve). The pulverized dried material was subsequently cation-exchanged with an ammonium sulfate solution at a temperature of 90° C. for 3 hours. The ammonium sulfate solution was prepared by dissolving 157 grams of ammonium sulfate in 1.5 liters of distilled water. Contacting of the pulverized dried material with the solution was carried out with constant stirring. The cation-exchanged material was filtered and water-washed with approximately 1.5 gallons of hot distilled water (about 160° F.) in 500 ml. increments. This cation-exchange procedure was repeated three times. Then the cation-exchanged material was dried in air at a temperature of about 250° F. at an air flow rate of about 1.5 cubic feet per hour for a period of about 2 to 3 hours and calcined in air for 3 hours at a temperature of 1,000° F. and an air flow rate of about 1.5 cubic feet per hour. A sodium analysis revealed that this cation-exchanged material contained 1.28 weight-percent sodium. The calcined, cation-exchanged material was subsequently cation-exchanged with ammonium sulfate an additional two times, washed, dried and calcined as above. The sodium content was then found to be 0.34 weight-percent sodium. An 88-gram portion of this low-sodium, cation-exchanged material containing Y-type aluminosilicate material was impregnated with a solution prepared by combining two solutions. The first solution was prepared by dissolving 8.4 grams of cobalt acetate in 50 ml. of hot distilled water (about 160° F.), adjusted to a pH of 5.0 by means of acetic acid. The second solution was prepared by dissolving 12.1 grams of ammonium molybdate in 50 ml. of hot distilled water (about 160° F.). The impregnated material was dried in air at a temperature of about 250° F. at an air flow rate of about 1.5 cubic feet per hour for a period of about 2 to 3 hours, pelleted into ¼ inch by ¼ inch pellets (with about 4 weight-percent Sterotex), and calcined in air for 3 hours at a temperature of about 1,000° F. and an air flow rate of about 1.5 cubic feet per hour. This catalyst, Catalyst A, was found to contain 33.6 weight-percent aluminosilicate material and was prepared to contain 2.5 weight-percent CoO and 10 weight-percent $MoO_3$. The alumina was Nalco HF large-pore-diameter alumina.

Catalyst B was prepared by employing an alumina slurry that had been obtained from the American Cyanamid Company. Cyanamid's designation for this slurry was No. 2234–1. The slurry was about 15 weight-percent alumina. An 866-gram portion of this alumina slurry was blended with 87.5 grams of sodium-form, Y-type aluminosilicate material prepared by the Linde Division of Union Carbide Corporation. This aluminosilicate material contained 80 weight-percent solids. After blending throughly in a Waring Blender, the mixture was dried overnight in air at a temperature of about 250° F. and an air flow rate of about 1.5 cubic feet per hour. The dried material was ground to pass through a 30-mesh sieve (U.S. sieve). The 30-mesh material was then cation-exchanged with an ammonium sulfate solution for 3 hours at a temperature of about 90° C. (194° F.). Contacting of the ground material with the ammonium sulfate solution was done with constant stirring. The ammonium sulfate solution was prepared by dissolving 150 grams of ammonium sulfate in 3 liters of distilled water. The cation-exchanged material was filtered and water-washed with approximately 1.5 gallons of hot distilled water (about 160° F.) in 500 ml. increments. The sodium content of the material was found to be 0.81 weight-percent sodium. The material was then cation-exchanged three more times as above and, after the filtering and water-washing following the last cation-exchange treatment, the material was calcined in air for 3 hours at a temperature of about 1,000° F. and an air flow rate of about 1.5 cubic feet per hour. The calcined cation-exchanged material was then found to have a sodium content of 0.04 weight-percent sodium. This catalyst support material was prepared to contain 35 weight-percent of the Y-type aluminosilicate material. A 95-gram portion of the above catalyst support material was impregnated with a combined solution of two other solutions. A solution prepared by dissolving 8.4 grams of cobalt acetate in 50 ml. of hot distilled water (about 160° F.), adjusted to a pH of 5.0 by means of acetic acid, was combined with a solution prepared by dissolving 12.1 grams of ammonium molybdate in 50 ml. of hot distilled water (about 160° F.). The impregnated material was dried in air for 2 to 3 hours at a temperature of about 250° F. and an air flow rate of about 1.5 cubic feet per hour, pelleted into ¼ inch by ¼ inch pellets (with about 4 weight-percent Sterotex), and calcined for 3 hours in air at a temperature of about 1,000° F. and an air flow rate of about 1.5 cubic feet per hour. Catalyst B was prepared to contain 2.5 weight-percent CoO and 10 weight-percent $MoO_3$. The alumina was Cyanamid large-pore-diameter alumina.

Catalyst C was prepared with an alumina sol obtained from the American Cyanamid Company. An 87.5-gram portion of sodium-form, Y-type aluminosilicate material obtained from the Linde Division of Union Carbide Corporation was blended into 1,384 grams of the alumina sol. After blending thoroughly, the sol was gelled by adding 150 ml. of a 15-percent ammonium hydroxide solution. The gelled blend was dried in air overnight at a temperature of about 250° F. and an air flow rate of about 1.5 cubic feet per hour. The dried blend was ground to pass through a 30-mesh sieve (U.S. sieve). The pulverized material was then cation-exchanged with an ammonium sulfate solution for 3 hours at a temperature of about 90° C. (194° F.). The ammonium sulfate solution was prepared by dissolving 100 grams of ammonium sulfate in 2 liters of distilled water. Contacting of the aluminosilicate material with the solution was carried out with constant stirring. The cation-exchanged aluminosilicate material was filtered and water-washed with approximately 1.5 gallons of hot distilled water (about 160° F.) in 500 ml. increments. The cation-exchange procedure was repeated three times. After the last exchange, the cation-exchanged material was washed free of sulfate anions, dried in air at 250° F. for about 16 hours at an air flow rate of about 1.5 cubic feet per hour, and calcined for 3 hours at a temperature of about 1,000° F. and a flow rate of about 1.5 cubic feet per hour. This cation-exchanged catalyst support material was found to contain 0.08 weight-percent sodium. The catalyst support material was prepared to contain 35 weight-percent aluminosilicate material. An 87.5-gram portion of the catalyst support material was impregnated with a combined solution of cobalt acetate and ammonium molybdate. This solution was prepared by combining a solution prepared by dissolving 8.4 grams of cobalt acetate in 50 ml. of hot distilled water (about 160° F.), adjusted to a pH of 5.0 by the addition of acetic acid, with a solution prepared by dissolving 12.1 grams of ammonium molybdate in 50 ml. of hot distilled water (about 160° F.). The impregnated material was dried in air at a temperature of about 250° F. and an air flow rate of about 1.5 cubic feet per hour for about 2 to 3 hours, pelleted into ¼ inch by ¼ inch pellets (with about 4 weight-percent Sterotex), and calcined in air for 3 hours at a temperature of about 1,000° F. and an air flow rate of about 1.5 cubic feet per hour. Catalyst C was prepared to contain 2.5 weight-percent CoO and 10 weight-percent MoO$_3$. The alumina was a conventional alumina.

Each of the above-described catalysts was tested in the above-described test unit under hydrocracking conditions that were within the ranges suggested for the hydrocracking process of the present invention. The hydrocracking activity and hydrocracking selectivity were obtained for each catalyst, and these values are presented in table II below. Catalyst C contained an ordinary active alumina; however, both Catalysts A and B contained embodiments of the large-pore alumina that is employed in the catalytic composition of the present invention. The alumina of Catalyst A was the large-pore alumina of the Nalco Chemical Company, while the alumina in Catalyst B was the large-pore alumina obtained from the American Cyanamid Company.

TABLE II

| | Catalyst Performance | | |
|---|---|---|---|
| Catalyst | A | B | C |
| Alumina Type | Nalco Large Pore | Cyanamid Large Pore | Cyanamid Ordinary |
| Relative Hydrocracking Activity | 152 | 117 | 98 |
| Heavy Naphtha | 59.7 | 59.8 | 59.8 |

The results of table II show that the embodiments of the catalytic composition of the present invention provide heavy naphtha yields which are equal to that furnished by the catalyst containing the ordinary alumina, i.e., the prior art catalyst. However, the activities of the embodiments of the catalytic composition of the present invention are much greater than that of the prior art catalyst, Catalyst C.

Surprisingly, the catalytic composition of the present invention, when employed in the hydrocracking process of the present invention, provides a superior hydrocracking process.

What is claimed is:

1. A process for the hydrocracking of a petroleum hydrocarbon fraction boiling in the range from about 350° F. to about 650° F., which process comprises contacting in a hydrocracking reaction zone under hydrocracking conditions and in the presence of hydrogen said hydrocarbon fraction with a catalytic composition comprising as a hydrogenation component a member selected from the group consisting of (1) a metal from Group VI-A of the Periodic Table of Elements and a metal from Group VIII of the Periodic Table of Elements, (2) their oxides, (3) their sulfides, and (4) mixtures thereof and a cocatalytic acidic support comprising a large-pore crystalline aluminosilicate material and a large-pore-diameter alumina, said alumina being characterized by a surface area within the range of about 150 square meters per gram to about 500 square meters per gram and an average pore diameter within the range of about 80 A to about 200 A, said hydrocarbon fraction being a member selected from the group consisting of a light catalytic cycle oil, a light virgin gas oil, and mixtures thereof.

2. The process of claim 1 wherein said large-pore crystalline aluminosilicate material is suspended in the porous matrix of said large-pore-diameter alumina and is present in an amount within the range of about 5 weight-percent to about 70 weight-percent based upon the weight of said support.

3. The process of claim 2 wherein said metal from Group VI-A is molybdenum and said metal from Group VIII is cobalt, said cobalt being present in an amount within the range of about 2 weight-percent to about 5 weight-percent, calculated as CoO and based upon the total weight of said catalytic composition, and said molybdenum being present in an amount within the range of about 4 weight-percent to about 15 weight-percent, calculated as MoO$_3$ and based upon the total weight of said catalytic composition.

4. The process of claim 2 wherein said large-pore crystalline aluminosilicate material is ultrastable, large-pore crystalline aluminosilicate material.

5. The process of claim 2 wherein said large-pore crystalline aluminosilicate material is a cation-exchanged Y-type aluminosilicate material.

6. The process of claim 2 wherein said hydrocracking conditions comprise a hydrogen-to-oil ratio within the range of about 5,000 SCFB to about 20,000 SCFB, a total hydrocracking pressure within the range of about 700 p.s.i.g. to about 4,000 p.s.i.g. an average catalyst bed temperature within the range of about 650° F. to about 850° F., and a LHSV within the range of about 0.1 to about 10 volumes of hydrocarbon per hour per volume of catalyst.

7. The process of claim 3 wherein said hydrocracking conditions comprise a hydrogen-to-oil ratio within the range of about 5,000 SCFB to about 20,000 SCFB, a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

8. The process of claim 3 wherein said large-pore crystalline aluminosilicate material is ultrastable, large-pore crystalline aluminosilicate material.

9. The process of claim 3 wherein said large-pore crystalline aluminosilicate material is a cation-exchanged Y-type aluminosilicate material.

10. The process of claim 4 wherein said hydrocracking conditions comprise a hydrogen-to-oil ratio within the range of about 5,000 SCFB to about 20,000 SCFB, a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

11. The process of claim 5 wherein said hydrocracking conditions comprise a hydrogen-to-oil ratio within the range of about 5,000 SCFB to about 20,000 SCFB, a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

12. The process of claim 8 wherein said hydrocracking conditions comprise a hydrogen-to-oil ratio within the range of about 5,000 SCFB to about 20,000 SCFB, a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

13. The process of claim 13 wherein said hydrocracking conditions comprise a hydrogen-to-oil ratio within the range of about 5,000 SCFB to about 20,000 SCFB, a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

14. The process of claim 1 wherein said hydrocracking conditions comprise a hydrogen-to-oil ratio within the range of about 5,000 SCFB to about 20,000 SCFB, a total hydrocracking pressure within the range of about 700 p.s.i.g. to about 4,000 p.s.i.g., an average catalyst bed temperature within the range of about 650° F. to about 850° F., and a LHSV within the range of about 0.1 to about 10 volumes of hydrocarbon per hour per volume of catalyst.

* * * * *

CERTIFICATE OF CORRECTION

Patent No. 3,622,501                           Dated November 23, 1971

Inventor(s) Ralph J. Bertolacini and Louis C. Gutberlet

It is certified that error appears in the above-identified patent and that said Letters Patent are hereby corrected as shown below:

Column 1, line 8, "oil" should be -- oils --
" ", line 18, "compound" should be -- compounds --
" ", line 65, "aluminosilicate" should be inserted between "crystalline" and "material"
" 2, line 16. "5.1" should be -- 5.0 --
" ", line 33, "the" should be inserted between "for" and "hydrocracking"
" ", line 41, "The important" should be -- Two important --
" 3, line 3, "per hour" should be inserted after "hydrocarbon"
" ", line 13, "(SCFHO)" should be -- (SCFHP) --
" ", line 19, "generally" should be -- general --
" ", line 20, "process" should be -- processes --
" ", line 21, "weight" should be -- weights --
" ", lines 22 & 23, "temperatures" should be -- temperature --
" ", line 23, "a" should be inserted between "of" and "hydrocracking"

" 7, lines 10, 11, 13, & 14, "cm.$^{'7E'1}$" should be -- $cm^{-1}$ --

" 10, line 46, "$C^7$-paraffin-naphthene" should be -- $C_7$-paraffin-naphthene --
" ", line 54, equation is typed incorrectly. Equation should be
-- $\Delta T°F. = (1.3)(R-12)$ --

" ", line 72, "$\frac{1}{T_9}$" should be -- $\frac{1}{T_0}$ --

" 15, line 9, "13" should be -- 9 --

Signed and sealed this 27th day of June 1972.

(SEAL)
Attest:

EDWARD M. FLETCHER, JR.            ROBERT GOTTSCHALK
Attesting Officer                  Commissioner of Patents